No. 869,951. PATENTED NOV. 5, 1907.
E. M. WILLIAMS.
COTTON HARVESTER.
APPLICATION FILED APR. 9, 1907.
3 SHEETS—SHEET 1.
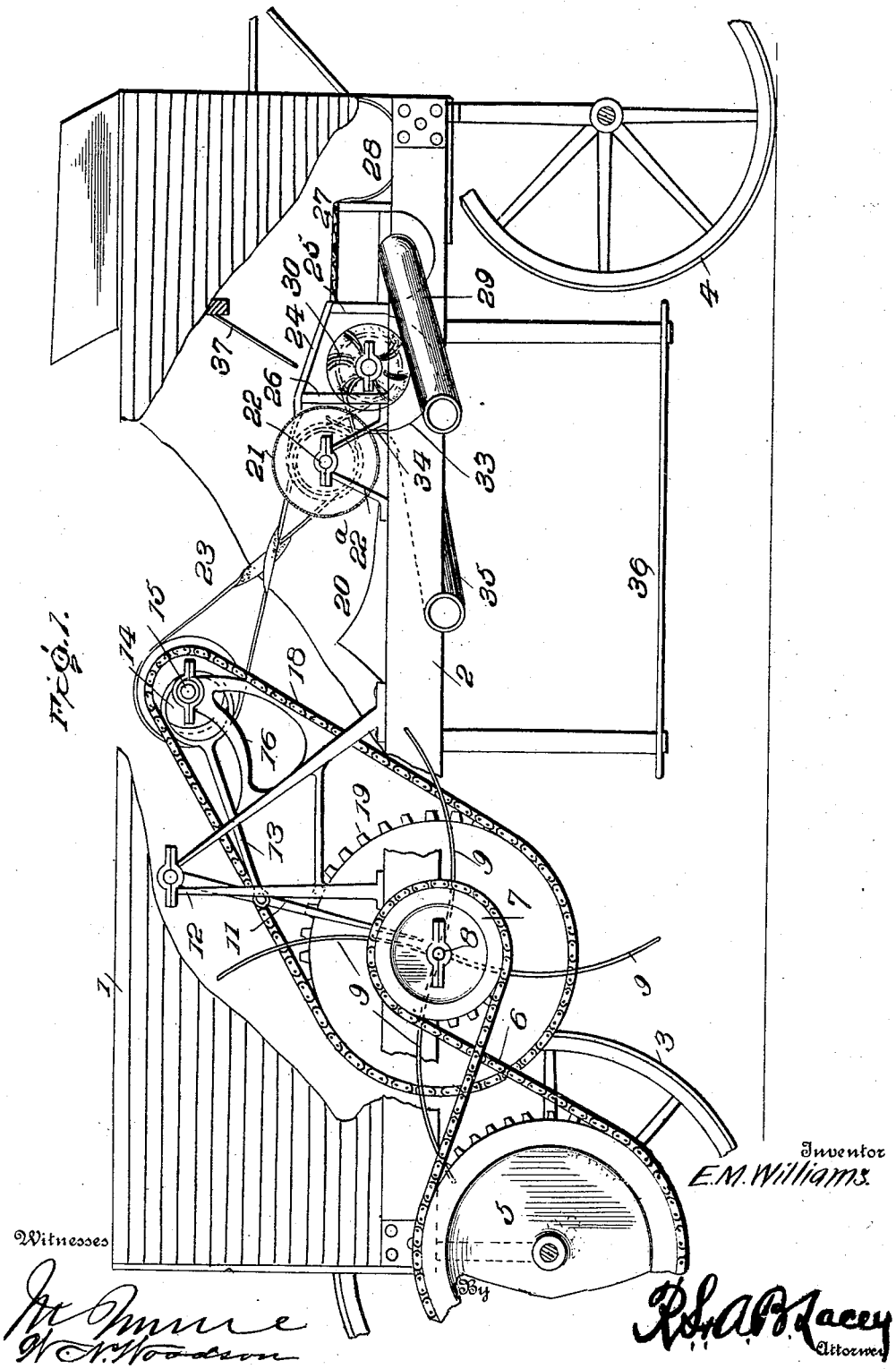

No. 869,951. PATENTED NOV. 5, 1907.
E. M. WILLIAMS.
COTTON HARVESTER.
APPLICATION FILED APR. 9, 1907.
3 SHEETS—SHEET 2.
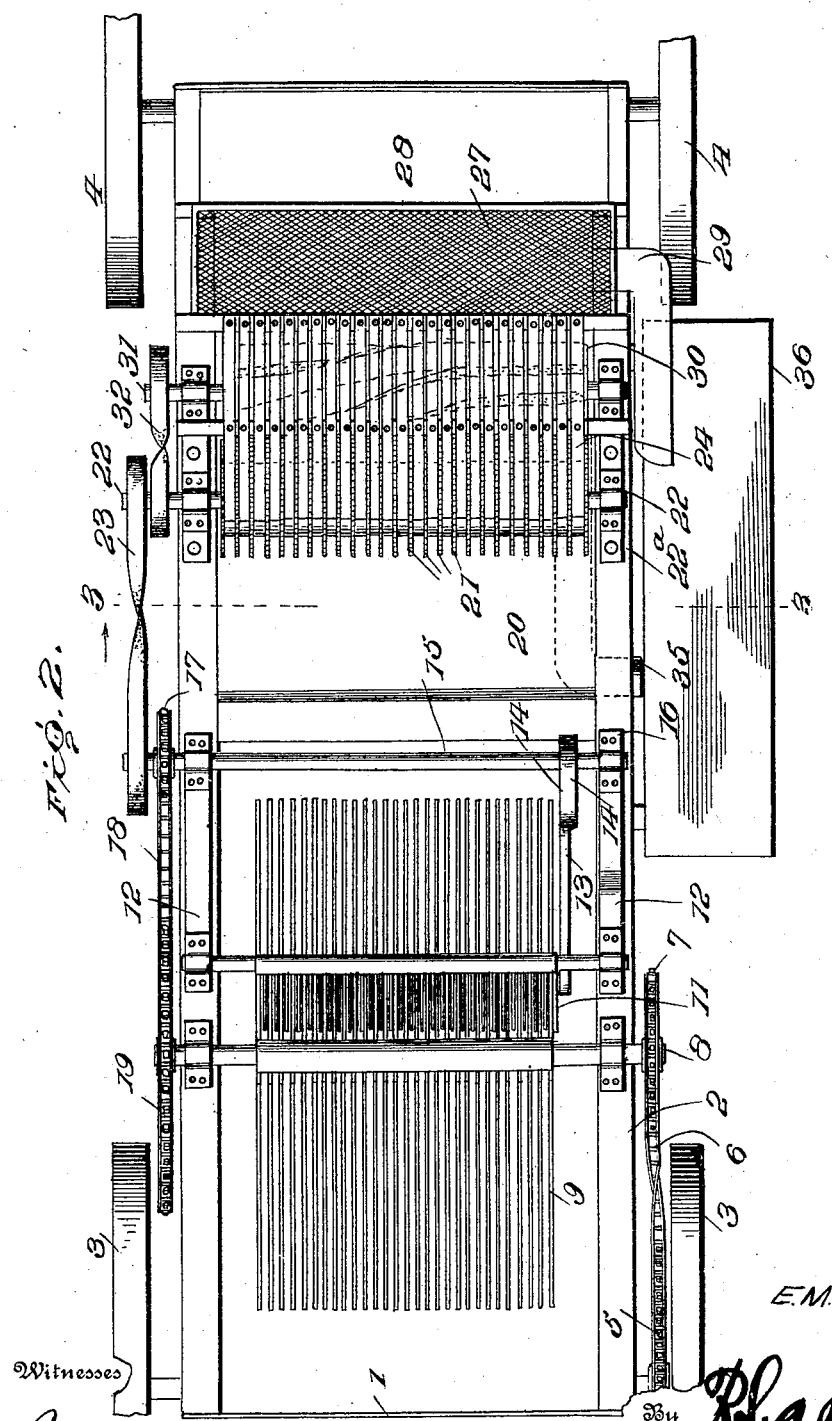

No. 869,951. PATENTED NOV. 5, 1907.
E. M. WILLIAMS.
COTTON HARVESTER.
APPLICATION FILED APR. 9, 1907.
3 SHEETS—SHEET 3.
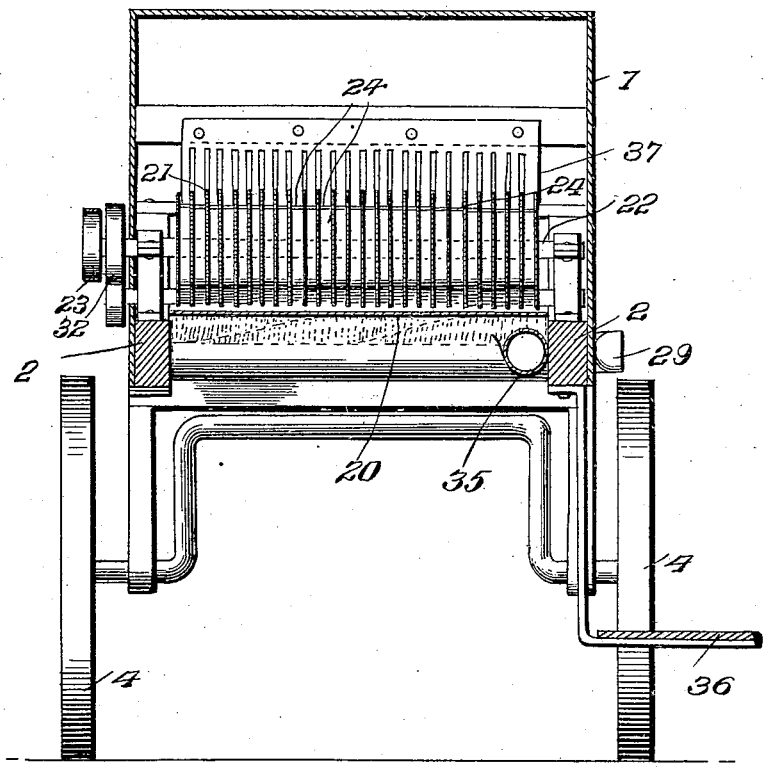
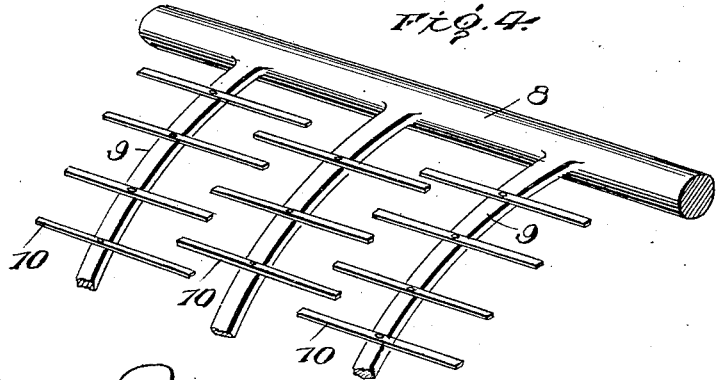
Inventor
E. M. Williams.
Witnesses
By
Attorneys

UNITED STATES PATENT OFFICE.

EDWARD M. WILLIAMS, OF DALLAS, TEXAS.

COTTON-HARVESTER.

No. 869,951.　　　　　　Specification of Letters Patent.　　　　　　Patented Nov. 5, 1907.

Application filed April 9, 1907. Serial No. 367,134.

*To all whom it may concern:*

Be it known that I, EDWARD M. WILLIAMS, a citizen of the United States, residing at Dallas, in the county of Dallas and State of Texas, have invented certain new and useful Improvements in Cotton-Harvesters, of which the following is a specification.

This invention has for its object a cotton harvesting machine which is adapted to take the place of the manual operation of picking cotton, and to be drawn over the cotton fields and automatically strip the bolls from the plants and carry them upwardly, automatically depositing them upon a pan whence they automatically pass to the gin carried by the vehicle in which the invention is embodied, the seed being separated from the fiber or lint and being deposited or discharged at one point while the lint is discharged at another point, the two discharge points for the lint and the seed being preferably so positioned that an operator standing on a running board at the side of the vehicle may hold the sacks for the reception of the cotton and seed and tie the sacks up when full and throw them off to be gathered by another attendant.

With these and other objects in view as will more fully appear as the description proceeds, the invention consists in certain constructions and arrangements of the parts which I shall hereinafter fully describe and then point out the novel features in the appended claims.

For a full description of the invention and the merits thereof and also to acquire a knowledge of the details of construction of the means for effecting the result, reference is to be had to the following description and accompanying drawings, in which:

Figure 1 is a side elevation, with parts broken away of my improved cotton harvester; Fig. 2 is a top plan view thereof with the casing or wagon box in section; Fig. 3 is a transverse sectional view on the line 3—3 of Fig. 2; and, Fig. 4 is a detail perspective view of the gathering forks.
Corresponding and like parts are referred to in the following description and indicated in all the views of the drawings by the same reference characters.

My improved cotton picking and ginning machine is embodied in a vehicle adapted to be drawn over the cotton fields, and said vehicle comprises a preferably closed body 1 which contains the majority of the working parts and which is provided with longitudinal sills 2 by which it is held in such an elevated position on the traveling wheels 3 and 4 as to clear the growing plants.

One of the rear wheels 3 is the driving wheel and for this purpose it is provided with a sprocket 5 connected by a cross belt or sprocket chain 6 to a relatively small sprocket wheel 7 on the transverse shaft 8 journaled in suitable brackets or boxings secured to the sills 2.

The shaft 8 carries spring forks 9 which are arranged in a plurality of radially extending series, four equidistant series being shown in the present instance. The forks of each series are spaced from each other as shown and are preferably bowed forwardly and each fork of a series carries a plurality of longitudinally spaced cross arms 10 preferably of fine spring wire. In the preferred arrangement, also, the spring cross arms 10 of every two adjacent springs are arranged in an alternating or staggered relation. As the machine is driven over the fields, these forks 9 sweep forwardly in succession and strip the bolls from the plants, and the cross bars or arms 10 spring back when they strike the branches and permit them to pass therethrough, but are strong enough to pull the cotton out of the bolls.

As the cotton is swept upwardly by a series of forks 9 in succession, it is stripped from said forks by means of a transversely extending series of vibrating stripping forks 11 which are suspended from their upper ends on a shaft supported on standards 12 mounted on the sills 2, as shown. These stripping forks 11 are vibrated by means of a pitman 13 connected to the rod which in turn connects all the forks for simultaneous movement, and said pitman is provided at one end with an eccentric strap fitting around an eccentric 14 on the transverse shaft 15 journaled in brackets 16 projecting forwardly and upwardly from the standards 12. The shaft 15 is driven by means of a sprocket wheel 17 and chain 18 from a relatively large sprocket wheel 19 on the shaft 8, and the gearing is so proportioned that the series of stripping forks 11 will sweep quickly forward and back, making a complete reciprocation as each series of picking forks 9 comes upwardly into operative relation therewith.

As the cotton is stripped from the picking forks 9, it falls on the forwardly sloping pan 20 within the vehicle casing or body 1 and slides down the same against the ginning saws 21 which are mounted in transverse series on the shaft 22 receiving its motion from the cross belt 23 which couples the shaft 15 and the shaft 22 together.　The shaft 22 is mounted in brackets 22ª on the side sills 2 of the vehicle. A series of saw cleaning bars 24 project into the spaces between the saws, as shown, said bars being supported by means of a cross beam 25 and a series of angle iron vertical supports 26. As the cotton is acted upon by the saws 21, the seed will be separated by means of the bars 24 and will roll down the bars onto the screen 27 which slopes forwardly as shown, and the rubbish will pass forwardly over the screen into the rubbish chute 28, while the seed will pass through the screen into the seed chute 29 which extends laterally and rearwardly and discharges at a point between the traveling wheels 3 and 4, as shown.

The fan 30 is mounted on a shaft 31 in front of the saws 21, said fan embodying a series of spiral blades and being driven by a belt 32 connecting its shaft 31 with the shaft 22. The cotton will thus be drawn off from the saws and be passed by the exhaust force of the fan into the cotton or lint bin 33, whence the lint will be passed rearwardly and outwardly through the discharge chute 35 and be caught in a sack which is held on the running board 36 where an attendant will stand and tie each sack as it is filled and throw it to one side. A series of bands 34 extends upwardly from one wall of the lint bin 33 between the saws, and act as guards for the bin and the saws, and another series of guards 37 is mounted above the bars 25 and is adapted to prevent any of the cotton or lint from passing forwardly onto the screen 27. These guards 37 are composed of spring rods.

From the foregoing description in connection with the accompanying drawings, it will be seen that as the vehicle is drawn over the fields cotton will be picked from the plants by the forks 9 and then stripped from the forks 9 by the stripping forks 11 which vibrate back and forth as the forks 9 sweep around. The cotton then passes forwardly along the sloping pan 20 for action by the ginning mechanism, so that the cotton is picked and ginned by a continuous process, with the use of my invention which separates the seed from the lint almost as soon as the cotton is picked and which also avoids the tiresome and relatively expensive hand process of picking now in vogue.

In the accompanying drawings, for the sake of clearness, the spring cross arms of the gathering forks are omitted, except in Fig. 4, which is drawn upon a sufficiently large scale to illustrate them.

Having thus described the invention, what is claimed as new is:

1. A cotton harvester comprising a wheeled support a series of picking forks mounted in said support, means for swinging said forks forwardly and upwardly whereby they will sweep through the growing plants, a series of vibrating stripping forks mounted in said support, means for actuating the stripping forks, ginning mechanism carried by the support and adapted to receive the cotton from the stripping forks, and means for driving the ginning mechanism.

2. A cotton harvester comprising a wheeled support, a series of picking forks mounted in said support, a revoluble shaft upon which said forks are carried, means for driving said shaft in the direction to carry the said forks forwardly and upwardly through the growing plants, a series of spring arms mounted in longitudinally spaced arrangement on the respective forks, the arms of one fork alternating with the arms of the next fork, and means for stripping the cotton from said forks.

3. A cotton harvester comprising a wheeled support, spaced picking forks, a shaft journaled in the support and extending transversely thereof, the picking forks being mounted on said shaft, a series of stripping forks suspended in the support, means for vibrating said stripping forks back and forth in the spaces between the picking forks, a shaft journaled in the support and provided with an eccentric, a pitman operatively connected at one end with said eccentric and having an operative connection with the stripping forks and an operative connection between the means for driving the picking forks and said eccentric shaft.

In testimony whereof I affix my signature in presence of two witnesses.

EDWARD M. WILLIAMS. [L. S.]

Witnesses:
C. W. COWAN,
E. L. GREENWOOD.